United States Patent
Huggett et al.

(10) Patent No.: US 10,371,795 B2
(45) Date of Patent: Aug. 6, 2019

(54) MONO-BIT MULTI-SIGNALS RADAR WARNING RECEIVER

(71) Applicant: BAE SYSTEMS INFORMATION AND ELECTRONIC SYSTEMS INTEGRATION INC., Nashua, NH (US)

(72) Inventors: James M. Huggett, Brookline, NH (US); Kevin S. Bassett, Nottingham, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 235 days.

(21) Appl. No.: 15/425,675

(22) Filed: Feb. 6, 2017

(65) Prior Publication Data

US 2018/0224523 A1    Aug. 9, 2018

(51) Int. Cl.
  *G01S 7/02*    (2006.01)
  *G01S 13/88*    (2006.01)

(52) U.S. Cl.
  CPC ............ *G01S 7/021* (2013.01); *G01S 13/886* (2013.01)

(58) Field of Classification Search
  None
  See application file for complete search history.

(56) References Cited

U.S. PATENT DOCUMENTS

| | | | |
|---|---|---|---|
| 3,614,399 A * | 10/1971 | Linz | G06F 7/58 331/78 |
| 4,665,560 A * | 5/1987 | Lange | H03G 3/3068 455/240.1 |
| 4,839,657 A | 6/1989 | Chikhani et al. | |
| 7,236,901 B2 | 6/2007 | Huggett | |
| 8,138,969 B2 | 3/2012 | Huggett et al. | |
| 10,020,968 B1 * | 7/2018 | Rodenbeck | H04L 27/227 |

(Continued)

FOREIGN PATENT DOCUMENTS

CA    2576754 A1    8/2008

OTHER PUBLICATIONS

International Search Report, Written Opinion of the International Searching Authority, 9 pages, dated Apr. 16, 2018.

*Primary Examiner* — Vladimir Magloire
*Assistant Examiner* — Donald H B Braswell
(74) *Attorney, Agent, or Firm* — Antony P. Ng; Russell Ng PLLC; Scott J. Asmus

(57) ABSTRACT

A radar warning receiver is disclosed. The radar warning receiver includes an antenna, a signal detection unit, a signal identification unit and an alarm. The antenna collects radio frequency (RF) signals. The signal detection unit is configured to generate a group of frequency and amplitude signals based on the collected RF signals. Specifically, the signal detection unit includes a pair of limiting amplifiers for converting the collected RF signals into corresponding pulsed output signals that track the actual frequency oscillations of the collected RF signals, and a pseudo-random noise generator for injecting noise into one of the limiting amplifiers. Based on the frequency and amplitude signals, the signal identification unit determines whether or not any of the collected RF signals includes a threat signal. The alarm is utilized to present a threat signal to a human operator.

15 Claims, 3 Drawing Sheets

(56) References Cited

U.S. PATENT DOCUMENTS

| | | | |
|---|---|---|---|
| 2004/0263378 A1* | 12/2004 | Jossef | G01S 7/022 |
| | | | 342/20 |
| 2005/0090982 A1 | 4/2005 | Mead et al. | |
| 2006/0290561 A1* | 12/2006 | Praskovsky | G01S 13/87 |
| | | | 342/26 D |
| 2009/0284286 A1 | 11/2009 | Van Den Berg et al. | |
| 2010/0283659 A1* | 11/2010 | Huggett | G01S 7/021 |
| | | | 342/20 |
| 2014/0009319 A1* | 1/2014 | Geswender | F41H 11/02 |
| | | | 342/5 |
| 2015/0246638 A1 | 9/2015 | Juel | |

* cited by examiner

MONO-BIT MULTI-SIGNALS RADAR WARNING RECEIVER

TECHNICAL FIELD

The present disclosure relates to radar warning systems in general, and in particular to a mono-bit multi-signals radar warning receiver.

BACKGROUND

Generally speaking, radar warning receivers are basically instantaneous frequency measurement receivers or radio frequency (RF) receivers that are typically used in electronic warfare. Utilizing interferometric techniques by detecting the phase shift magnitudes produced in multiple calibrated delay lines, radar warning receivers can measure the frequencies of signals radiated from hostile radars and the frequencies of incoming RF signals.

With the advent of multi-gigahertz speed logic, a mono-bit sampling technique followed by a broadband channelized digital receiver has become an effective way to achieve gigahertz bandwidth with adequate sensitivity. The primary drawback is that strong signals with a very high signal-to-noise ratio can cause problems. In particular, high-powered signals above a broadband noise causes several issues with the measured results at specific clock to signal ratios and also there is no way to recover good amplitude information from the strong signals. In addition, other signals similar in amplitude are suppressed and distorted, and the distortion can cause measurement errors on the strong signals.

One solution to the above-mentioned problems is to use log detection amplifiers to measure amplitudes of strong signals, and the sampling frequency can be changed when a signal appears to be at a bad clock-to-signal frequency ratio. This approach requires a significant amount of extra active components, and importantly, does not respond fast enough to obtain reliable measurements on every signal.

Consequently, it would be desirable to provide an improved radar warning system with better dynamic range and more consistent accuracy while still maintaining a simple and low-cost design.

SUMMARY

In accordance with one embodiment of the present disclosure, a radar warning receiver includes an antenna, a signal detection unit, a signal identification unit and an alarm. The antenna collects radio frequency (RF) signals. The signal detection unit is configured to generate a group of frequency and amplitude signals based on the collected RF signals. Specifically, the signal detection unit includes a pair of limiting amplifiers for converting the collected RF signals into corresponding pulsed output signals that track the actual frequency oscillations of the collected RF signals, and a pseudo-random noise generator for injecting noise into one of the limiting amplifiers. Based on the frequency and amplitude signals, the signal identification unit determines whether or not any of the collected RF signals includes a threat signal. The alarm is utilized to present a threat signal to a human operator, in one example, or otherwise take evasive actions.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Figure 1:
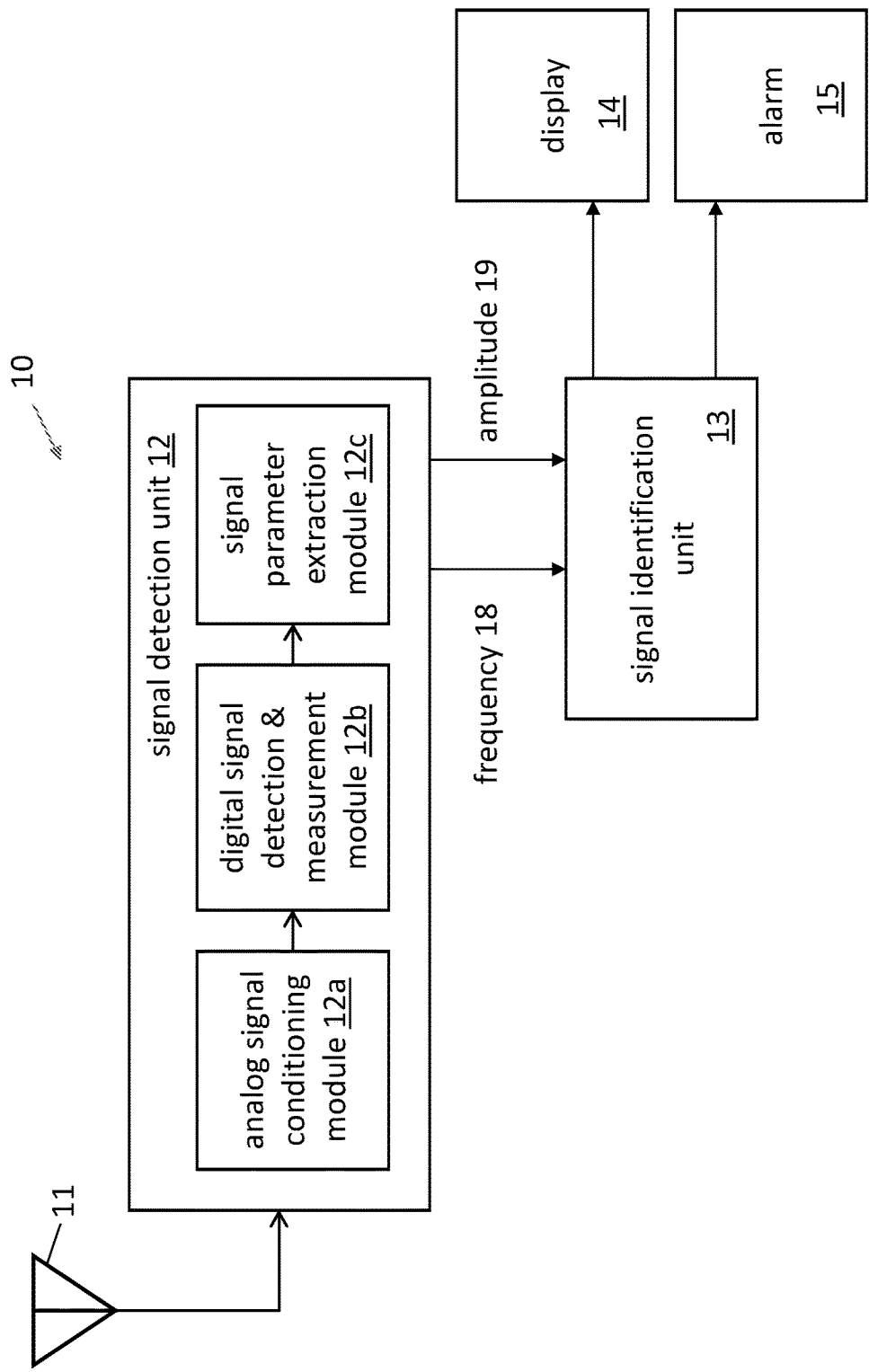
FIG. 1 is a high-level block diagram of a radar warning receiver, according to one embodiment.

Referring now to the drawings and in particular to FIG. 1, there is illustrated a high-level block diagram of a radar warning receiver, according to one embodiment. As shown, a radar warning receiver 10 includes an antenna 11, a signal detection unit 12, and a signal identification unit 13. In one example, radar warning receiver 10 is communicatively coupled to a display 14 and/or an alarm 15. Antenna 11 collects radio frequency (RF) signals and sends them to signal detection unit 12 that generates frequency signals 18 and amplitude signals 19. Derived pulse parameters from frequency signals 18 and amplitude signals 19 include pulse width, time of arrival, modulation types, etc. Signal detection unit 12 includes an analog signal conditioning module 12a, a signal detection & measurement module 12b and a signal parameter extraction module 12c.

Signal identification unit 13, in one example, utilizes a look-up database to correlate with the received RF signals in order to identify whether or not any of the received RF signals is a threat signal. The indication of the presence of a threat signal can be provided on display 14 and/or alarm 15 in order to alert a human operator. Alarm 15 can be an audio alarm and/or visual alarm. In a further embodiment, the output of signal identification unit 13 is coupled to the processing electronics of a system, such as a plane or unmanned aerial vehicle, and uses the output to take evasive actions. The evasive action, in one example, includes jamming or changing speed and/or course.

Figure 2:
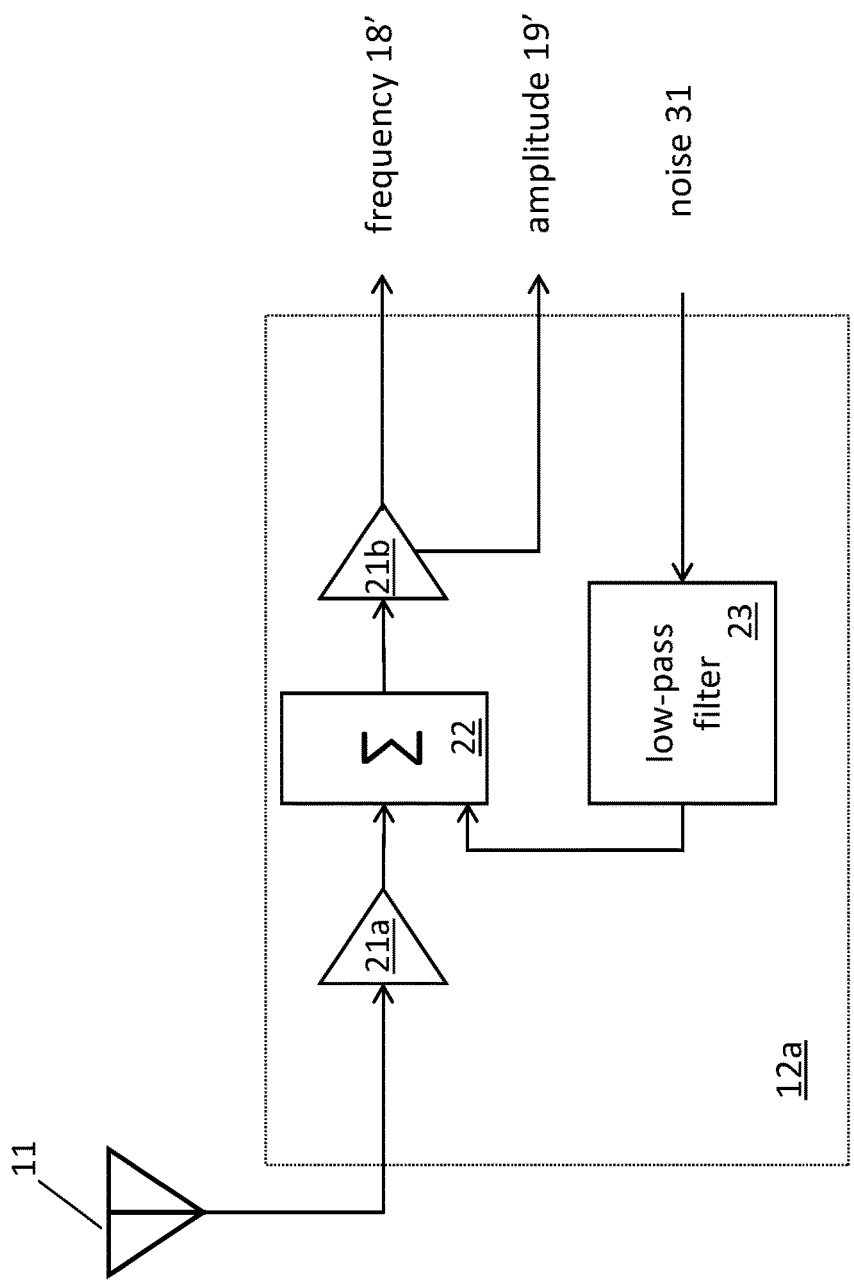
FIG. 2 is a detailed block diagram of an analog signal conditioning module within the radar warning receiver from FIG. 1.

With reference now to FIG. 2, there is illustrated a detailed block diagram of analog signal conditioning module 12a within signal detection unit 12 from FIG. 1. As an analog front-end, analog signal conditioning module 12a includes two limiting amplifiers 21a, 21b, an adder 22 and a low-pass filter 23. Limiting amplifier 21a is a high dynamic range low-noise amplifier that can simultaneously receive multiple RF signals collected by antenna 11. Limiting amplifier 21a operates in its linear region to set a system noise figure, and quantizes the RF signals received from antenna 11 into one of two levels—either high (logical 1) or zero (logical 0). Basically, limiting amplifier 21a converts RF signals from antenna 11, which may be in the frequency range from VHF to 40 gigahertz, to a pulse output.

Adder 22 combines the outputs from limiting amplifier 21a with the outputs from low-pass filter 23, and then feeds the results to limiting amplifier 21b. Limiting amplifier 21b amplifies both the signals and noise to a constant output level. The combination of limiting amplifier 21a and limiting amplifier 21b supplies the required system gain. A high-speed clock (not shown) can be utilized to sample the output of limiting amplifier 21b. The clock speed can be between, for example, 80 and 100 gigahertz in order to provide the requisite high sampling rate for wide bandwidth operations. Low-pass filter 23 sets the upper frequency limit for noise 31 being added to the RF signals from antenna 11. Limiting amplifier 21b generates frequency signals 18' and amplitude signals 19'.

Figure 3:
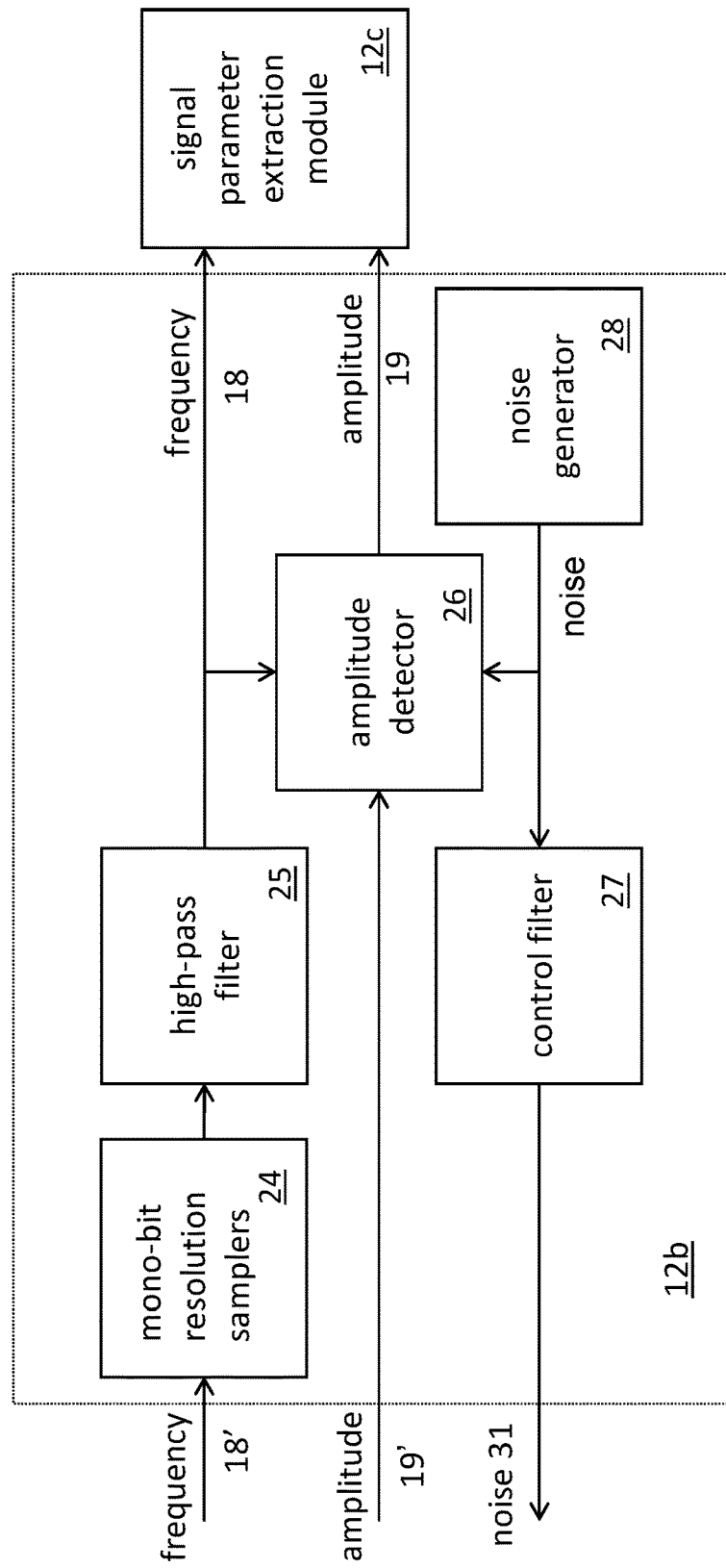
FIG. 3 is a detailed block diagram of a digital signal detection & measurement module within the radar warning receiver from FIG. 1.

Referring now to FIG. 3, there is depicted a detailed block diagram of digital signal detection & measurement module 12b within signal detection unit 12 from FIG. 1. As the digital back-end, digital signal detection & measurement module 12b includes two mono-bit resolution samplers 24, a high-pass filter 25, an amplitude detector 26, a control filter 27 and a noise generator 28. Mono-bit resolution samplers 24 are in essence high-speed digital latches.

High-pass filter 25 eliminates dither noise from the received RF signals. The lower frequency limit of high-pass filter 25 is set to filter out the added noise to the RF signals in FIG. 2. After frequency signals 18' have been filtered by high-pass filter 25, frequency signals 18 are sent to amplitude detector 26 and signal parameter extraction module 12c. Amplitude detector 26 digitizes analog amplitude signals 19' from amplifier 21b, and determines when a signal approaches the level of the pseudo-random noise. Amplitude detector 26 also channelizes the signal stream into two bands and looks for a channel imbalance indicating the presence of a strong signal. Signal parameter extraction module 12c, which in a simple instantiation, calculates a signal's input frequency (in megahertz) and its amplitude (in decibels).

Noise generator 28 is utilized to provide pseudo-random noise to amplitude detector 26 for detecting amplitude information from amplitude signals 19. For example, narrowband noise for the above-mentioned function can be generated digitally by using a pseudo-random noise generating algorithm followed by a low-pass filter (not shown). The pseudo-random noise is also sent back to low-pass filter 23 (in FIG. 2) via control filter 27. Feedback can be utilized to adjust the narrowband noise amplitude of amplitude signals 19 by controlling the spectrum of noise generator 28.

Controlled narrowband noise can be utilized to improve the accuracy and total dynamic range of mono-bit resolution samplers 24. Controlled narrowband noise can also be utilized to enhance the instantaneous multi-signal dynamic range of mono-bit samplers 24. Control filter 27 adjusts the amplitude of the added noise based on the amplitude of the strongest input signal. Frequency signals 18' from limiting amplifier 21b are sampled by mono-bit resolution sampler 24 with the samples being clocked by the above-mentioned high-speed clock. If the amplified signal is sampled at, for example, 50 gigahertz, then a 25 gigahertz instantaneous bandwidth can be achieved according to the Nyquist theory. A quadrature hybrid can be utilized to feed two mono-bit resolution samplers 24, thus doubling the effective bandwidth by creating both an in-phase and quadrature data stream. Specific frequencies depend upon a particular application and the input frequencies to be measured. One scenario may be: input measurement frequency band of 2-18 GHz; low-pass noise up to 1 GHz; high-pass limit of 2 GHz and up; and noise amplitude adjustment "on-the-fly" based on the input amplitude.

Radar warning receiver 10 starts with a large amount of gain such that the output is driven into saturation, as shown in the above-mentioned description for amplifier 21b. All radar warning receivers have some amount of broadband noise that comes from a combination of external and internal noise sources. Since this noise is driven to saturation, the resulting output will be a sequence of logical 1's and 0's that toggle back and forth in a random pattern. If only broadband noise is present, then digitally filtering the broadband noise at any frequency will result in an output sequence with a power level related to the input noise. If a small signal is added to the input received RF signals, then the output signal sequence will be shaped to show more logical 1's when the signal voltage is high, and more logical 0's when the signal voltage is low.

A digital filter tuned to the frequency of the signal can then show the presence of the signal while at other frequencies there will still only be the noise level. If the input signal has increased in power, then the random noise nature of the signal sequence will change to a deterministic pattern driven by the input signal. In this case, signal distortion can be detected at frequencies other than the center frequency of the input, and at many other frequencies, the noise power level will go to zero. This is the problem being addressed by the present disclosure.

By adding in additional noise equivalent to received RF signals, the pseudo-random nature of the output sequence is restored, and the averaging that takes place in the filtering allows measurements at other frequencies to go back to what they should be by adding a random element to the distortion signals. A key feature of radar warning receiver 10 is that the random noise does not have to be broadband, the random noise only needs to have bandwidths that are wider than the bandwidth of filter(s) utilized to recover signals in downstream processing, such as signal parameter extraction module 12c. This narrowband noise can be filtered out digitally via high-pass filter 25 (from FIG. 3). By generating the narrowband noise at a low frequency, high-pass filter 25 only needs to be of a high-pass design.

The addition of narrowband noise can linearize the effect of a strong signal, thus making it possible to detect multiple signals and have good signal measurement results. If no strong signals are present, then the spectrum of the data stream can be altered such that very little power lies within the narrowband filter band. By closely coupling the detection of signals near the saturation point with the noise feedback, a response time substantially less than most minimum pulse widths can be achieved. Signal amplitude can be derived by adding the resulting signal-to-noise ratio measured in the channelized receiver with the known amplitude of the feedback narrowband noise. The condition where a signal is near saturation can be detected by digitally filtering the mono-bit data stream into a band matching the noise, and one matching the signal band.

If the power density in each of the filters (i.e., low-pass filter 23, high-pass filter 25 and control filter 27) is about the same, then there is no strong signal present. After the narrowband noise has been added, then the filters separate the added narrowband noise from the received RF signal so the amplitude of the received RF signal can continue to be monitored.

The added noise does reduce the overall sensitivity of radio warning receiver 10 even though it is present, but by only applying it when the strong signal is detected. Maximum receiver sensitivity is retained for most of the time and during the presence of a strong signal, other strong signals can still be detected and measured accurately since they are no longer being degraded or masked by the strong signal distortion.

As has been described, the present disclosure provides an improved radar warning receiver that is capable of operating over a wide input dynamic range on a pulse-by-pulse basis at 50 dB or greater.

The improved radar warning receiver mixes narrowband noise with incoming RF signals before mono-bit sampling. The narrowband noise eliminates frequency errors at bad frequency to clock ratios and improves multi-signal performance. The amplitude of the narrowband noise can be digitally controlled in time frames well under the duration of a typical radar pulse, thus enabling feedback that greatly enhances the dynamic range of the radar warning receiver as well as creating an amplitude measure by monitoring the amplitude of the feedback required. The improved radar warning receiver also ensures high fidelity signal copy and measurement even for high signal-to-noise ratio signals that would otherwise saturate a conventional radar warning receiver.

While the invention has been particularly shown and described with reference to a preferred embodiment, it will be understood by those skilled in the art that various changes in form and detail may be made therein without departing from the spirit and scope of the invention.

What is claimed is:

1. A radar warning receiver, comprising:
   a signal detection unit comprises
      a first limiting amplifier for converting a plurality of collected radio frequency (RF) signals to corresponding pulsed output signals that track frequency oscillations of said collected RF signals;
      a second limiting amplifier for converting said pulsed output signals to a plurality of frequency and amplitude signals;
      an adder connected between said first and second limiting amplifiers;
      a noise generator for injecting noise to one of said limiting amplifiers;
      a plurality of mono-bit resolution samplers, coupled to one of said limiting amplifiers, for sampling said frequency signals and noise; and
      a high-pass filter for eliminating noise in said sampled frequency signals output from said mono-bit resolution samplers;
   a signal identification unit for determining whether or not if any of said collected RF signals contains a threat signal, after the receipt of said plurality of frequency and amplitude signals; and
   an alarm for dispatching an alert in response to a determination that said collected RF signals contains a threat signal.

2. The radar warning receiver system of claim 1, wherein said signal detection unit further comprises a low-pass filter, connected to said adder, for receiving said noise from said noise generator.

3. The radar warning receiver of claim 1, wherein said mono-bit resolution samplers are digital latches with samples being clocked at between 40 to 50 gigahertz.

4. The radar warning receiver of claim 1, wherein said signal detection unit further comprises an amplitude detector for seeking a channel imbalance that indicates presence of a strong signal.

5. The radar warning receiver of claim 1, wherein said noise generator generates pseudo-random noise via a pseudo-random noise generating algorithm followed by a lowpass filter.

6. The radar warning receiver of claim 1, wherein said noise is injected to one of said limiting amplifiers via an adder located between said limiting amplifiers.

7. The radar warning receiver of claim 1, wherein said signal identification unit utilizes a look-up database to correlate with said collected RF signals to identify whether or not if any of said collected RF signals contains said threat signal.

8. The radar warning receiver of claim 1, wherein said alert is one of visual and audio.

9. The radar warning receiver of claim 1, wherein said alert is communicated to a processing system that takes evasive action.

10. A radar warning receiver system, comprising:
    an antenna for collecting a plurality of radio frequency (RF) signals;
    a signal detection unit comprises
       a first limiting amplifiers for converting at least some of said collected RF signals to corresponding pulsed output signals that track frequency oscillations of said collected RF signals;
       a second limiting amplifier for converting said pulsed output signals to a plurality of frequency and amplitude signals;
       an adder connected between said first and second limiting amplifiers;
       a low-pass filter connected to said adder; and
       a noise generator for generating pseudo-random noise to be injected to said second limiting amplifier via said low-pass filter and said adder;
    a signal identification unit for determining whether or not said collected RF signals a threat signal, after the receipt of said plurality of frequency and amplitude signals; and
    an alarm for dispatching an alert in response to a determination that said collected RF signals contains a threat signal.

11. The radar warning receiver system of claim 10, wherein said signal detection unit further comprises mono-bit resolution samplers, coupled to one of said limiting amplifiers, for sampling said frequency signals and noise.

12. The radar warning receiver system of claim 10, wherein said alert is at least one of visual and audio.

13. The radar warning receiver system of claim 10, wherein said alert is communicated to a processing system that takes evasive actions.

14. The radar warning receiver system of claim 10, wherein said signal detection unit further comprises an amplitude detector for detecting the amplitude of said collected RF signals.

15. The radar warning receiver system of claim 10, wherein said signal detection unit further comprises a control filter for adjusting the amplitude of said pseudo-random noise based on the highest amplitude of said collected RF signals.

* * * * *